March 3, 1970 W. N. MILLER, JR., ETAL 3,497,978
TRAVELING SIGN BOARD
Filed Sept. 18, 1967 7 Sheets-Sheet 1

INVENTORS
William N. Miller, Jr. &
Ronald Emus
BY Shoemaker and Mattare
ATTORNEYS March 3, 1970 W. N. MILLER, JR., ETAL 3,497,978
TRAVELING SIGN BOARD
Filed Sept. 18, 1967 7 Sheets-Sheet 4

Fig. 5.

INVENTORS
William N. Miller, Jr.
& Ronald Emus
BY Shoemaker and Mattare
ATTORNEYS March 3, 1970 W. N. MILLER, JR., ETAL 3,497,978
TRAVELING SIGN BOARD
Filed Sept. 18, 1967 7 Sheets-Sheet 5

INVENTORS
William N. Miller, Jr.
& Ronald Emus
BY Shoemaker and Mattare
ATTORNEYS March 3, 1970  W. N. MILLER, JR., ETAL  3,497,978
TRAVELING SIGN BOARD
Filed Sept. 18, 1967 7 Sheets-Sheet 6

INVENTORS
*William N. Miller, Jr. &
Ronald Emus*
BY *Shoemaker and Mattare*
ATTORNEYS March 3, 1970  W. N. MILLER, JR., ETAL  3,497,978
TRAVELING SIGN BOARD
Filed Sept. 18, 1967  7 Sheets-Sheet 7

INVENTORS
William N. Miller, Jr. &
Ronald Emus
BY
Shoemaker and Mattare
ATTORNEYS

United States Patent Office 3,497,978
Patented Mar. 3, 1970

3,497,978
TRAVELING SIGN BOARD
William N. Miller, Jr., P.O. Box 565, Greenville, S.C. 29602, and Ronald Emus, Greer, S.C.; said Emus assignor to said Miller
Filed Sept. 18, 1967, Ser. No. 668,410
Int. Cl. G09f 11/28
U.S. Cl. 40—32        9 Claims

ABSTRACT OF THE DISCLOSURE

A traveling sign comprising indicia carrying endless belt means trained about spaced drums for rotation of said belt. Motor means is provided for tilting the drums to maintain the proper position of the belt, the motor means being actuated in response to coaction of spaced means disposed adjacent the belt with spaced zones on said belt, which means senses movement of said belt from its normal position for effecting correction of said belt position in varying degrees at various times.

BACKGROUND OF THE INVENTION

The fundamental features of the present invention relate to a unique manner of utilizing an endless belt which may be as long as 32 feet or of less or greater length, and relatively wide, and which belt is disposed about and in contact with oppositely disposed drums at each end of a supporting framework. The movement of the belt, which is effected by at least one of the drums being motor driven, initiates the actuation of motors, which motors, in turn, effect movement of the drums when the belt on either one or both of the drums has moved upwardly or downwardly, and thus maintains the belt in its proper vertical relationship with respect to both of the drums.

Heretofore in the operation of such endless belts for signs, one of the difficulties that has been experienced for many years is the maintaining of the belt in its proper association with the drums about which it is trained. There have been provided spaced pegs on the drums and openings in the belt in an endeavor to maintain the belt in proper association with each drum, and even this has failed because, at times, the pegged drums would not register with the openings and this would result, no doubt, in the ruining of the belt. Other mechanical means, such as spaced grooves on the drums being provided to receive therein ribs on the inner side of the belt to keep it in position have also failed to properly maintain the belt in its association with the drums, and also flanged drums have been utilized, but in all prior attempts the belt has been mutilated and in most instances ruined, and particularly where the belt is of considerable length, say 30 or more feet.

The belts are indeed expensive and carry indicia thereon, and it is important that these belts not be ruined in their movement about the drums. Additionally, it is not known that anyone in the prior art has produced a successful and unfailing operation of an endless belt sign due to the fact that there has been no particular means for maintaining that belt in its proper association with the drums.

SUMMARY OF THE INVENTION

The problems encountered with the prior art movable belt signs have been eliminated with the unique structures and arrangement of the components of the present invention. The combination of the new components of the present invention results in correcting any deviation of the belt with respect to either one or both of its drums, and thus maintain substantially constantly the belt in its proper association and relationship with each of the drums for a continuous movement of the belt and a continuous showing of the indicia on the belt, and without damaging the belt or ruining same.

A further feature of the present invention is that, once installed outdoors, the same will require a minimum of upkeep, if any, and everything considered the present invention results in producing a traveling sign which is considerably less expensive to manufacture at the outset and to maintain in proper working condition than such traveling signs in the prior art.

An object of the present invention, therefore, is to provide a unique traveling sign which embodies means for adjusting the vertical disposition of one or both oppositely disposed rotatable drums on which an endless belt is supported when the belt has moved even slightly upwardly or downwardly on either one or both of the drums to restore the belt to its proper relationship with said drums.

Another object of the invention is to provide a traveling sign board wherein there is an endless belt trained about oppositely disposed rotatable drums and which drums and belt have no physical interengaging components for maintaining the belt in its proper position with respect to one or both of the drums, and means to adjust one or both of the drums when the said belt has moved either upwardly or downwardly with respect to one or both of the drums.

DESCRIPTION OF THE DRAWINGS

FIG. 4a–4b is a composite vertical sectional view taken along line 4a–4b of FIG. 3;

FIG. 5 is an enlarged vertical sectional view showing the driven end of the sign board together with the drum tilting mechanism, and is taken along line 5—5 of FIG. 4a;

DESCRIPTION OF THE PREFERRED EMBODIMENT

The sign is indicated generally at S. Suitable spaced I-beams I supported at their lower ends in concrete or any other suitable way have adjacent their upper ends spaced channel beams C, with the flat surfaces thereof in engagement on opposite sides with the flat surfaces of the I-beams. These channel beams are supported on each I-beam by means of similar pairs of right angularly shaped brackets B, which pairs engage the outer sides of the flanges C' of each channel member C. The angle flange B' of the brackets B engages the respective opposite edges of the flanges of the respective I-beams I. The brackets B are maintained in their position about each I-beam by means of bolts D that extend through the opposite flanges of these brackets. The brackets B themselves are held together by means of bolts E, and with this construction as will be seen more clearly from FIG. 13, the channel members C are rigidly secured in position about the I-beams I.

Attached adjacent one end of the channel beam C, there is a lug 20 with an opening therethrough and which lug may be welded as at 21 to the upper flange of the beam C. There is a yoke mounting bracket 22 of substantially C-shape, which is attached by means of spaced bolts 23 and 23' to flange 24 of bracket 25, which bracket is pivotally mounted on the lug 20 by means of a headed bolt 26, and this constitutes the pivotal axis of the drum. The yoke mounting bracket is preferably welded as at 27 to the yoke Y. The yoke has similarly extending arms 28, and at the end of each arm 28 there is provided similar oppositely disposed aligned bearings 29, into each of which bearings is positioned the ends of stub shafts 30. The stub shafts are centrally disposed and aligned in opposite ends of belt drum 31, whereby the drum will rotate in the bearings 29.

Figures 6, 7, 8:
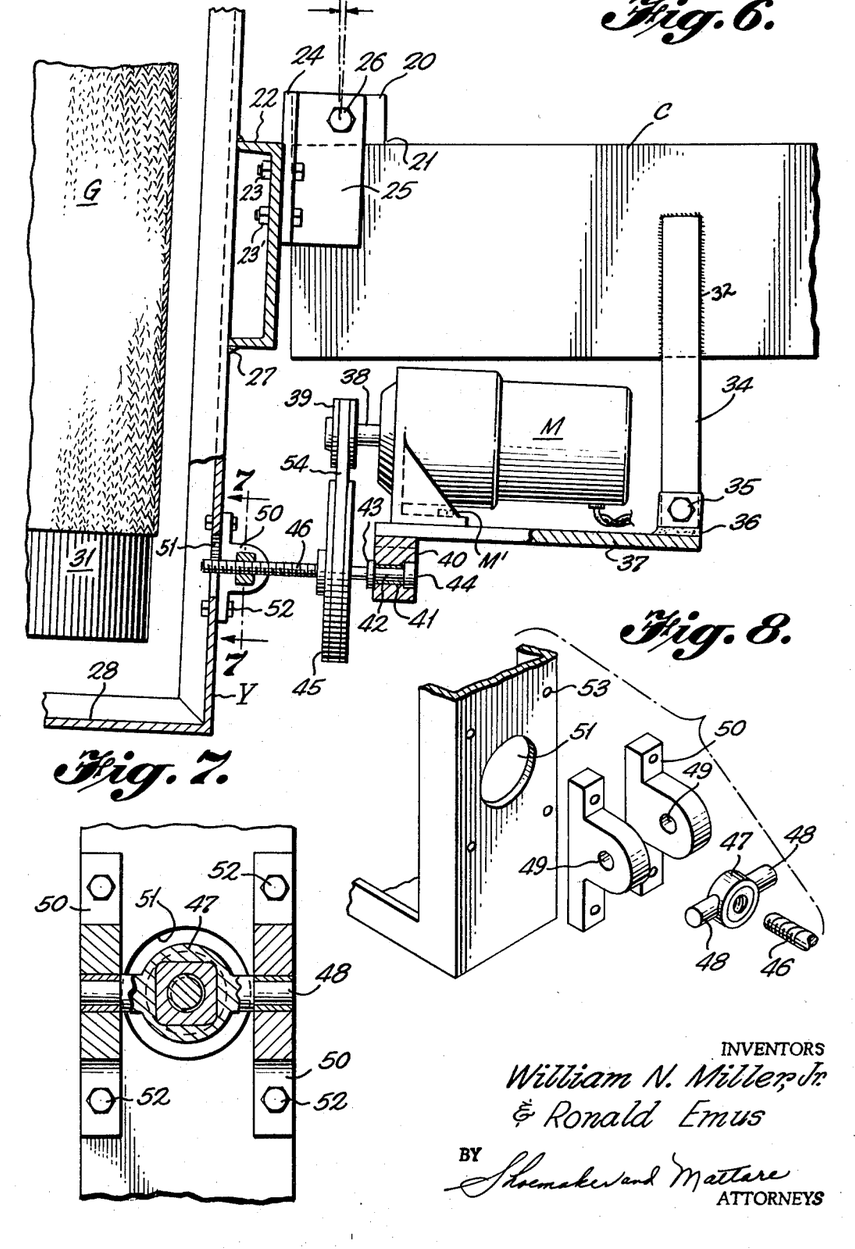
FIG. 6 is a fragmentary detail view showing the tilting mechanism which is associated with the driven drum of the traveling sign board.
FIG. 7 is a vertical cross-sectional view taken along line 7—7 of FIG. 6, showing the threaded trunnion which receives the threaded tilt drive shaft.
FIG. 8 is an isometric view of the structure of FIG. 7.

As will be clearly seen in FIG. 6, each channel of beam C has a similar elongated connecting rod 34 welded at their upper ends at 32, and the lower ends of each of said rods are secured by means of bolts 35 to upstanding welded lugs 36, which lugs are at the end of the motor tilting platform 37. A suitable electric motor M is secured by means of bolts M' to the platform 37 and with the driven shaft 38 projecting therefrom and has a pulley wheel 39 thereon. Projecting downwardly from the motor supporting platform 37 is a revolving screw mounted fixture 40 which is provided with an opening 41 therein and into which there is positioned and revolvably held the end of screw shaft 42 by means of bosses 43 and 44. On this same shaft 42, there is positioned a larger pulley wheel 45, which pulley wheel is splined to shaft 42 and projects therebeyond as at 46 in screw threaded form. This screw threaded portion of shaft 42 engages an internally threaded opening in a bearing nut 47 and which bearing nut has oppositely projecting cylindrical studs 48 which fit into oppositely aligned openings 49 in nut supporting brackets 50 which are supported on opposite sides of an opening 51 in the yoke Y and held thereon by suitable bolts 52 which extends through openings 53 in the said yoke. A driving chain or belt 54 is trained over the pulleys 39 and 45, respectively, for effecting driving by means of the threaded nut of the threaded screw portion 46 of the shaft 42, which results in a tilting of the yoke which supports the rotatable drum 31, which drum has about a portion thereof a cloth covering G which may be used, and if used, performs a frictioning function on the inner side of the indicia carrying belt later described.

Figure 4A:
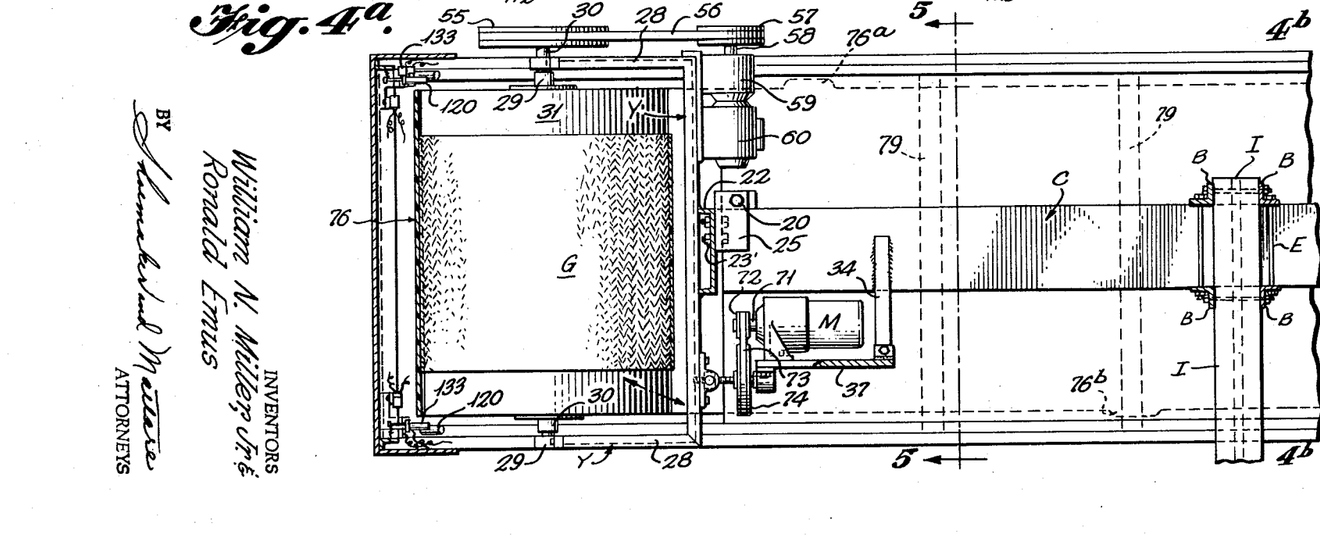

There is an extension of the drum shaft 30 on which is mounted a pulley 55 with a belt or chain drive 56 trained thereover and also over another pulley 57 which is on the end of a shaft 58 extending through a reduction gearing mechanism 59, which said gearing is driven by a motor 60. At the opposite end of the frame structure, there is provided a yoke 61 that is similar to yoke Y in FIG. 4a. This yoke has arms 62 and 63, at the ends of which are bearings 64 and 65 in alignment. There is a drum 66 which is the same size and diameter as the drum 31. This drum 66, however, has outwardly extending stub shafts 67 and 68 mounted respectively in the bearings 65 and 64 for rotation therein. There is a bracket 69 similar to bracket 22 in FIG. 4a, and below the same is a yoke tilting motor 70 having a shaft 71 on the end of which is a pulley 72 with a belt 73 trained thereover and also over a larger pulley 74 similar to pulley 45 in FIG. 6, which drives a screw threaded portion of the shaft 75 the same as shaft 46 in FIG. 6, and the nut and mounting structure 47 and 49 and 50 are the same as in FIGS. 6 and 8, whereby when the screw 74 is rotated by means of the motor 70, the yoke 61 will be tilted as described hereinafter.

Figures 4B, 9:
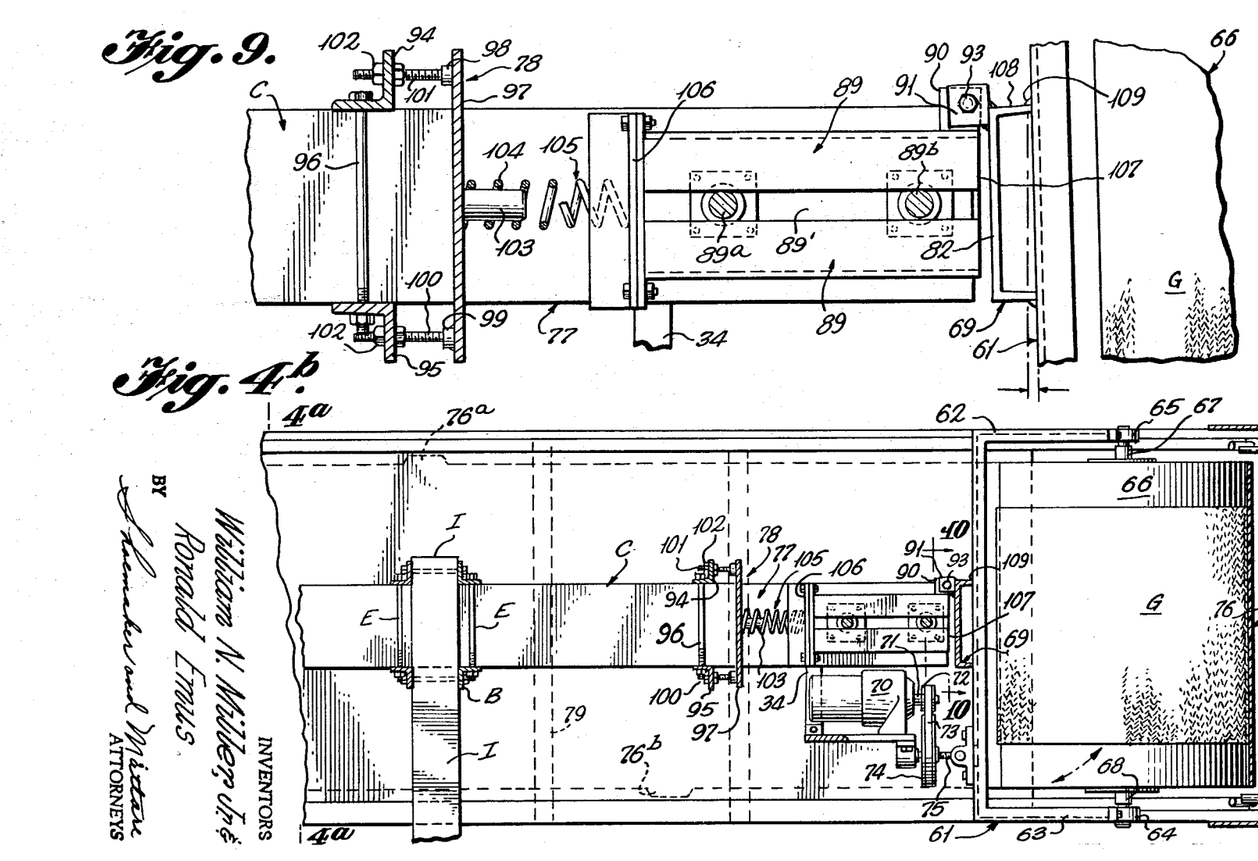
FIG. 9 is an enlarged longitudinal sectional view of the idler drum tensioning mechanism in an operative position to illustrate the tilting function of the machine, taken along line 9—9 of FIG. 3.
Figure 10:
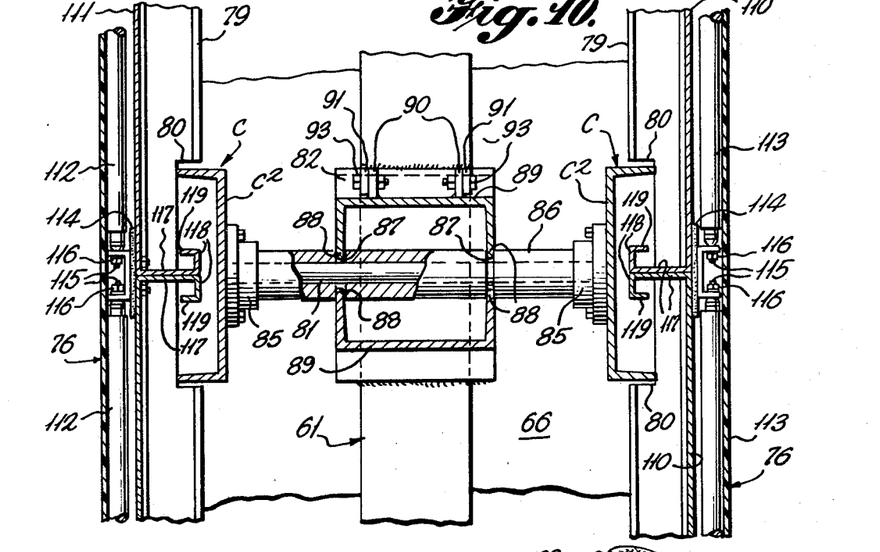
FIG. 10 is a transverse cross-sectional view taken along line 10—10 of FIG. 4b.
Figure 11:
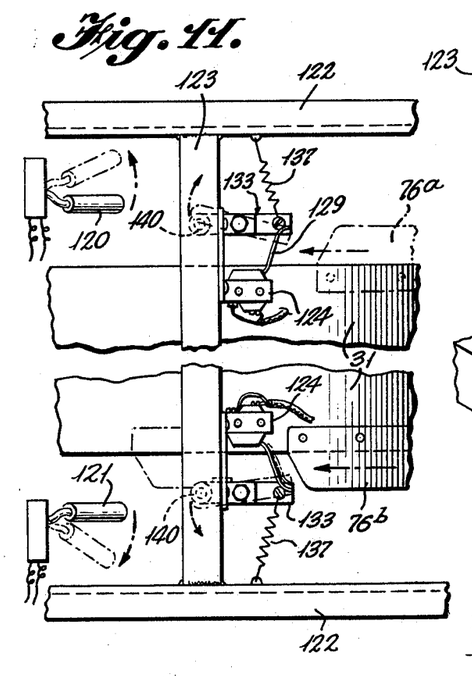
FIG. 11 is a diagrammatical illustration of the switch mechanism which controls the angle of tilt of the driven and idler belt drums, and of the control tabs mounted at intervals along the belt.

In FIGS. 4b, 9 and 10, there is disclosed on adjustable spring tensioning means generally indicated at 77, which tends to exert a constant force on the yoke 61 and consequently, the drum 66 carried thereby to maintain the indicia carrying endless belt 76, which has alternately staggered and spaced apart switch operating tabs 76a and 76b spaced throughout the entire length of the belt, and on both side edges thereof, and which belt extends about and is in contact with each drum 31 and 66. The belt 76 may, if desired, have suitable elongated brackets H disposed at spaced intervals thereon and these brackets may have one or more openings H' into which hooks or the like J secured to the inner face of a placard, sign or the like K may be inserted to support the said placard.

The belt tensioning means is mounted on one of the channel beams C and includes a fixed bracket structure generally denoted at 78, which is held on the channel beam C by means of oppositely disposed right angular brackets 94 and 95. Suitable bolts 96 maintain these brackets 94 and 95 in place on the beam C. There is a follower plate 97, which has oppositely spaced sockets 98 and 99 therein, into which the ends of screw shafts 100 and 101 are fixedly positioned. The screw shafts may be adjusted so as to move the plate 97 relative to the fixed brackets 94 and 95 by means of nuts 102 that are disposed on opposite sides of the flanges of the brackets 94 and 95. The plate 97 carries substantially centrally thereof an outstanding spring mounting stud 103 and which has positioned thereabout several coils 104 of a coil spring 105.

The end of the coil spring 105 engages the ends of plates 106, which plates, in turn, are secured to the ends of the hollow guide members 89 and normally exert pressure on these guide members which have their ends 107 hinged to a yoke bracket 108 which is secured to the said yoke as by welding at 109. The increment of tilting movement of the drum 66 results from the operation of the motor 70 and the screw 75 shown in FIG. 4b. In FIG. 10, extending between the opposite faces $C^2$ of the channel beam C, there is a shaft 81 positioned in suitably oppositely disposed bearings 85 and surrounded by a sleeve 86 which is suitably grooved as at 87 to receive in said grooves the edges 88 of similarly formed hollow guide members 89. On the top side of the guide members, there is positioned a bracket 90 and a lug 91, there being an opening in bracket 90, not shown, registering with an opening in 91, through which openings there is a bolt 93 which constitutes the pivotal drum axis.

The operation of the force of the spring 105 on the plates 106 and against the yoke bracket 108 will, of course, maintain the taut condition of the indicia carrying belt 76 about both drums 66 and 31.

Figure 3:
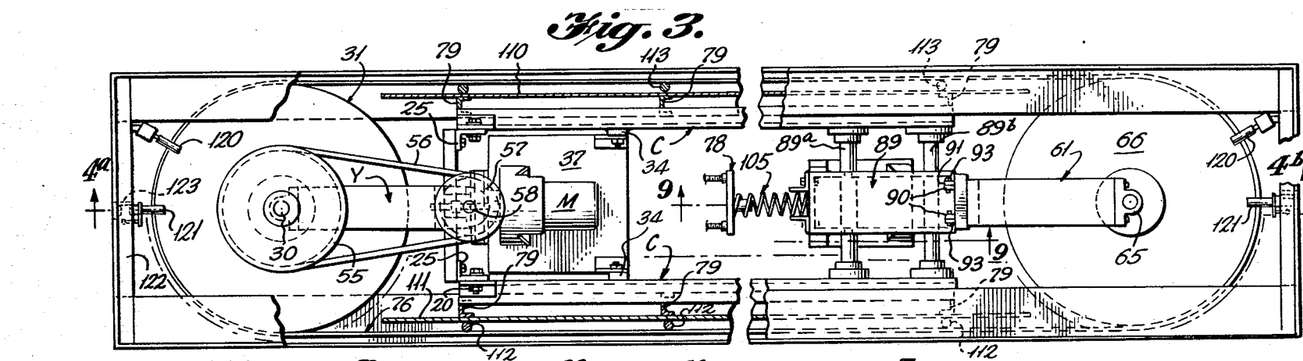
FIG. 3 is a plan view of the traveling sign board removed from the stationary sign board in which it may be mounted, with certain parts being broken away.
Figure 13:
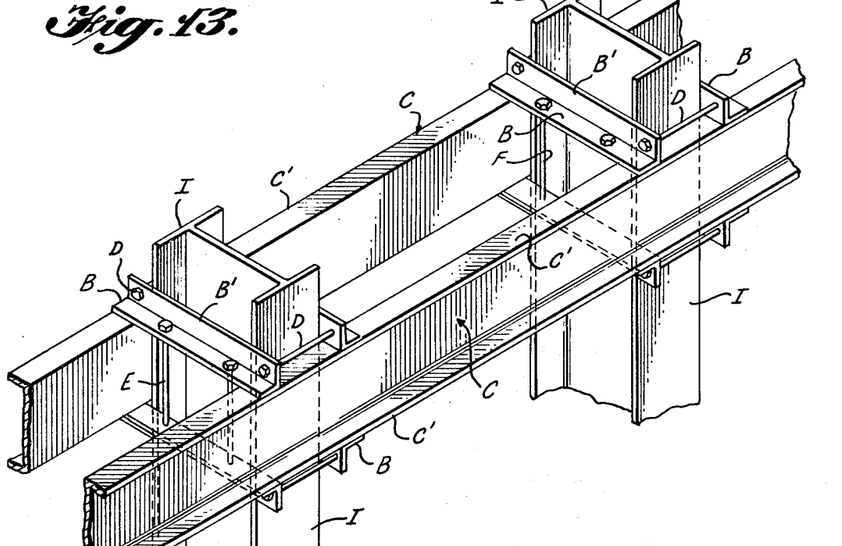
FIG. 13 is an isometric view of the clamping means utilized to simply and easily mount the traveling sign board to two vertical support posts.

It will be seen that there are opposite upstanding right angled supports 79, see FIG. 3, at spaced intervals along the frame constituted by the I-beams and channel beams, FIG. 13, on opposite sides of the same. These supports 79 each has secured to it, as by welding or other suitable means, elongated substantially flat side wall structures 110 and 111. Exteriorly of each of these side wall structures 110 and 111, there are disposed pairs of elongated rotatable buffer rollers 112 and 113. Secured to the side wall structures and over a cushioning base 114, which may be rubber or the like, there are similar U-shaped brackets and the legs of which brackets each having an opening therein and through which opening the shaft 115 of each roller is positioned and held thereon by a suitable nut or the like 116.

It will be seen from FIGS. 3 and 10 that the indicia bearing belt 76 engages these rollers and prevents it from engaging the wall structures 110 and 111 respectively. Incidentally, the wall structures are each similarly turned inwardly as at 117 and then oppositely bent as at 118 and each with a flange 119. The inwardly extending portion 117 of each of the side walls is preferably spot welded or otherwise secured together.

The drum 31 is actually the driven drum, being driven, of course, from the motor 60. At the upper and lower edges of the turn of the belt respectively, see FIGS. 3, 4a, 11 and 12, there are positioned closely adjacent thereto cut-off safety switches 120 and 121. These switches are mounted on a frame 122 which substantially surrounds the entire structure. There is a connecting brace 123 between the side bars of the frame 122 and there is one of these connecting braces at the end of the frame. Inside of this connecting brace 123, there is mounted thereon a microswitch 124 supporting bracket 125 which is welded or riveted at 126 to the connecting brace 123.

Figure 12:
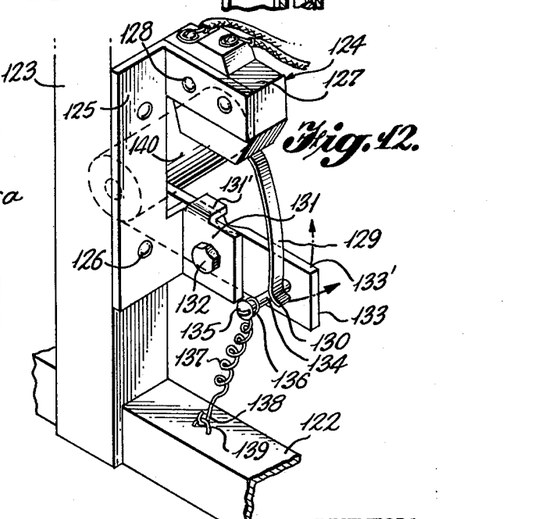
FIG. 12 is a perspective view of one of the switches which are operated by the belt control tabs shown in FIG. 11.

There is a right angularly extending arm 127 from the bracket 125 to which, as at 128 by riveting or the like, the microswitch 124 is connected, and this microswitch has a downwardly curved depending actuating arm 129 having its extreme end 130 curved. Also extending from the bracket 125, there is still another right angularly extending arm 131 and to this arm 131 there is pivotally mounted as at 132 an elongated rectangularly shaped roller supporting arm 133. An upper portion 131' of the arm 131 is turned over in U-shaped form and overlaps an upper edge 133' of the elongated arm 133. Adjacent one end portion of the arm 133, there is an outwardly extending pin 134 which is headed at 135, and to which is attached one end 136 of a coil spring 137, and the other end of the spring 138 has its end attached to an eyelet 139, whereby there is a tendency for the said spring to rock the arm 133 on the pivot 132 against the U-shaped overlapped portion 131' and maintain a roller 140 in its upward position. Upon displacement of the belt from its normal operating position, the tabs carried thereby engage the roller 140 thus pivoting arm 133 and causing contact of pin 134 with end 130 of switch actuating arm 129 of effect tilting of the drum or drum and repositioning of the belt. It is understood that the structure defined with regard to the bracket 125 and through 140 is duplicated adjacent each edge of the belt.

MODIFICATION OF THE INVENTION

Figure 14:
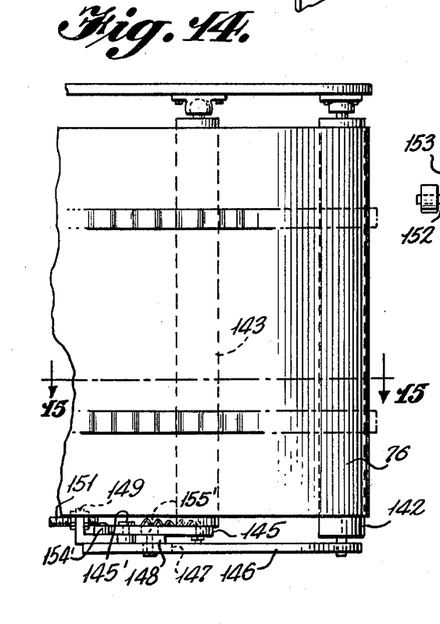
FIG. 14 is a side elevation of a modified idler end utilizing two tiltable vertical rollers in conjunction with a fixed vertical roller.
Figure 15:
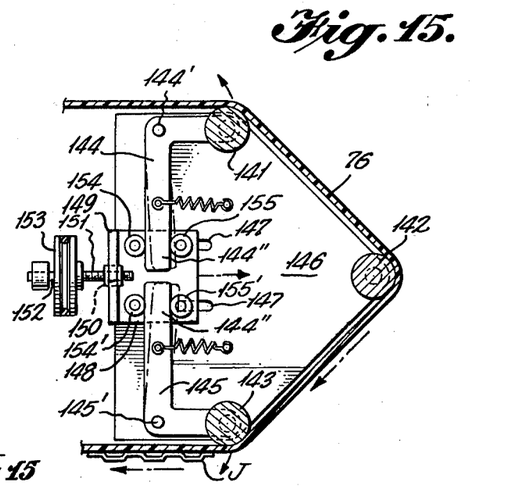
FIG. 15 is a detailed horizontal sectional view taken along line 15—15 which shows how two of the three rollers may be automatically tilted by an associated tilt drive motor.

In the modification of the invention shown in FIGS. 14 and 15, it will be noted that there are three rollers 141, 142 and 143 formed in sort of triangular relationship, with 142 being the central roller and rollers 141 and 143 being in opposite aligned positions. The roller 142 is mounted in a fixed position, whereas rollers 141 and 143 are at the outer ends of bell crank levers 144 and 145 respectively, which said levers are pivoted as at 144' and 145'. There is a base structure 146 in which there are spacedly formed similar elongated slots 147. There is an adjustment plate 148 having an upstanding flange 149 thereon having a screw threaded opening 150 therein through which extends an exteriorly screw threaded portion 151 of a shaft 152 having thereon a suitable pulley 153. There is a pair of fixed rollers 154 and 154' carried on the plate 148 and a pair of rollers 155 and 155' that have headed pins disposed in the slots 147, whereby when the pulley 153 is operated, such as the pulleys 74, FIGS. 3 and 4a, the threaded shaft will be turned and either advance or retract the plate 148, and thus effect, by means of the rollers 154, 154', 155, and 155', a similar movement of each of the inner portions 144' of the bell crank levers 144 and 145 respectively, and, of course, in so doing, tension will be applied to the endless indicia carrying belt 76 and maintain the belt in a taut condition about the drum 31. In other words, the modification of the invention in FIGS. 14 and 15 would serve to substitute for the spring urging emans 105 and its associated elements 89.

The function of the hereinbefore described components of the invention is indeed rather simple. The whole sign, of course, is supported by the beams I. The substantially identical drums that are positioned at each end of the frame structure are rotatably supported in the outer end portion of the yokes. The belt 76, which is preferably of fiber glass but which may be made of any suitable material and which may carry any kind or different kinds of indicia thereon or applied thereto, is endless and is trained about each of the rotatably mounted drums. It must be kept in mind that the sign may be as much as 32 feet long or longer or shorter as desired and the belt, at its opposite marginal edges, has outstanding therefrom spacedly and alternately on each edge thereof, suitable tabs 76b, and said tabs, while the belt is motor driven, will pass by the roller 140 which is associated with a microswitch at the bottom and top edges of the driven drum just so long as the belt is in proper position on each of the drums. However, if the belt should tend to either rise or lower on either one or both of the drums, the tabs projecting from opposite marginal edges of the belt would each engage a roller or rollers which initiate operation of a microswitch or switches, and by means of the motor 70 and the driven screw threaded shaft 74 connected with the motor and with the yokes carrying each of the drums, effect movement of the yoke or yokes and consequently the drums to position either or both drums in their tilted or off-vertical belt connecting position or positions, and thus bring the belt to its proper position on one or both drums, depending of course as to whether one or both microswitches have been initiated, and then return the drum or drums to their normal proper vertical operating positions in a similar fashion once the condition causing displacement of the belt ceases to exist. In extreme cases, the tabs would also engage either or both of the cut-off safety switches 120 and thereby disconnect the driving motor 60 for the driven drum 31. The belt may travel as much as 5 to 6 feet per second more or less, of course, depending on the particular indicia to be displayed. It is optional as ot whether the textile or other sutiable frictional covering G is used about either drum 66 or 31.

Figure 1:
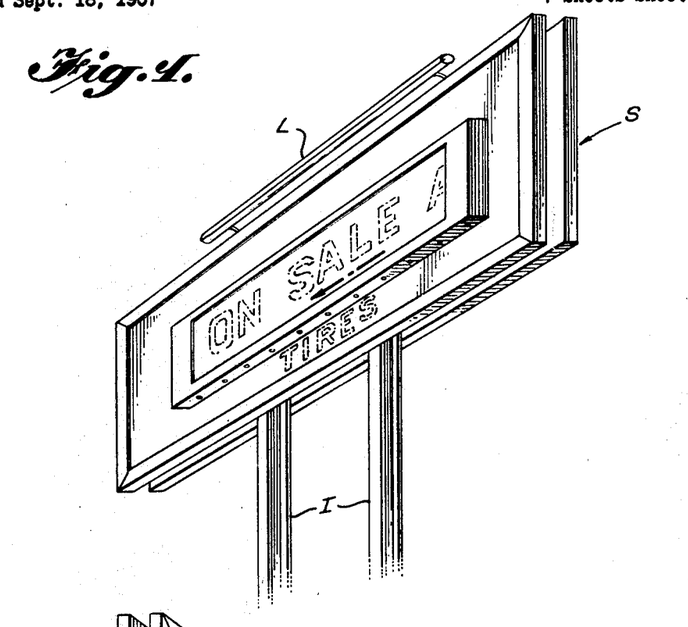
FIG. 1 is a perspective view of a preferred form of the present invention.
Figure 2:
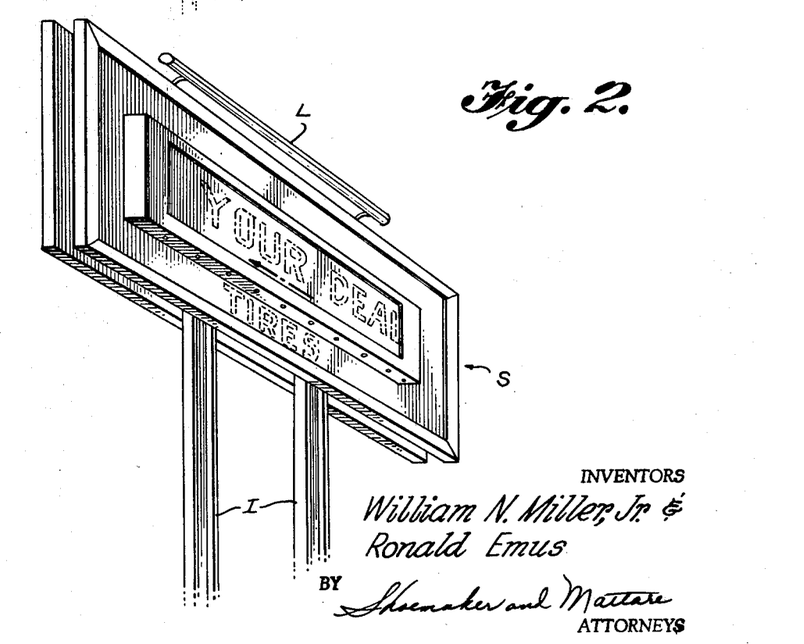
FIG. 2 is a perspective view of the reverse side of the sign board illustrated in FIG. 1.
Figure 5:
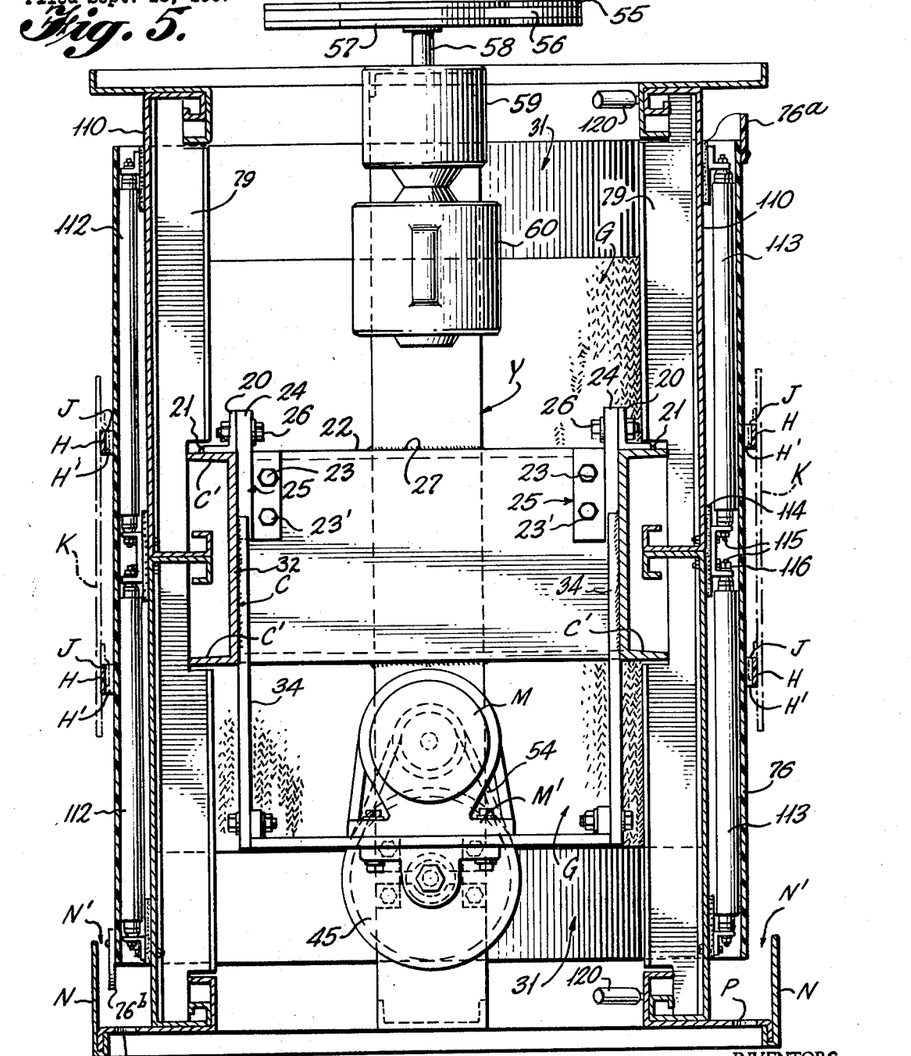

The sign as shown in FIGS. 1 and 2 is preferably illuminated by an elongated fluorescent tube or the like L or, of course, by any other illuminating means either interiorly or exteriorly of the sign, as desired. The exterior shape of the sign, as will be understod, may well be of different formations or suitably colored or ornamented in any way. The endless belt is exposed at all times and under severe outdoor testing condtions, the belt of 30 feet or more has performed perfectly for a protracted period of time and has been maintained in proper association with the drums and without being damaged in any way. As will be noted from FIG. 5, there is a surrounding upstanding shield N, whereby water, snow and the like may enter through the passageway N' and be discharged through a series of openings P in the bottom portion of the frame. The belt is, of course, waterproof and weatherproof in all respects. The diameter and height of each drum may be of about 2' x 42", but will vary depending on the width and length of the belt being driven.

The electrical circuitry necessary for connecting the various motors and other driven elements of the invention is conventional and is not shown.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. In a traveling sign, elongated frame means, a drum rotatably positioned at spaced apart positions on the frame means, means for rotating one of said drums, a flexible endless indicia carrying belt positioned about each drum, spaced zones of limited linear extent carried by the belt and defining interruptions in the linear configuration of the belt, spaced apart means disposed adjacent each drum either or both of which means engages the spaced zones on said belt when the belt has moved either upwardly or downwardly on either a drum or drums, means operatively connected to said spaced means and to at least one of said drums to effect automatic tilting of either one or both of said drums from their normal positions to properly position the belt with respect to a drum or drums, and for effecting repositioning of the tilted drum or drums with said belt thereabout to their normal operating positions said spaced apart means in coaction with said spaced zones on said belt initiating and controlling the extent of correction in said belt position.

2. A traveling sign as defined in and by claim 1, wherein there is means to maintain the belt in taut operative condition about both drums.

3. A traveling sign as defined in and by claim 2, wherein there is spring urged means utilized to maintain the belt in its taut condition about both drums.

4. A traveling sign as defined in and by claim 1, wherein the spaced apart means disposed adjacent each drum is an electrical switch and said switch or switches are initiated by coaction with said spaced zones.

5. The traveling sign as defined in and by claim 1, wherein the means for effecting tilting of the drum or drums and for re-positioning of the drum or drums is electric motor driven means.

6. The traveling sign as defined in and by claim 1, wherein each drum is rotatably mounted in a yoke, means for pivotally mounted the yoke t othe frame, and motor operated means connected with the yoke which, when operated, effects slight movement of said yoke carrying the drum to tilt one or both drums and also to restore the drum or drums to its or their proper position of rotation.

7. A traveling sign as defined in and by claim 1, wherein the means for rotating the said one drum is electric motor means in operative connection with the drum for rotating the same, and thus rotating the other drum about its axis by means of said belt, when the belt about each drum should become displaced axially of either or both drums there is additional motor operated means initiated by the movement of the belt and coaction of the spaced zones on the belt with suitable means positioned adjacent its opposite edges and acting to maintain the proper disposition of each drum and thus the proper positioning of the belt about each of the drums.

8. The traveling sign as defined in and by claim 1, wherein each drum is mounted in a yoke, pivotal mounting means for the said yoke attached to the frame, automatically operating yoke moving means, motor operated means in operative association with one of the drums for driving the same, electric switch means adjacent the opposite edges of the drum and the belt, the said spaced zones on said belt comprising outwardly extending alternately disposed switch engaging tabs, said tabs engaging the switch means when the belt is displaced from its proper position on either of the drums and the said switch means, when initiated by said tabs, effecting movement of the said motor means which moves the yoke about its pivot point to effect the proper positioning of the belt about one or both of said drums.

9. The traveling sign as defined in and by claim 1, wherein the belt is about thirty feet, more or less, in length and wherein the drums and belt are vertically disposed.

References Cited

UNITED STATES PATENTS

| | | | |
|---|---|---|---|
| 1,188,154 | 6/1916 | Cross | 40—32 |
| 2,294,996 | 9/1942 | Mercier | 74—241 |
| 2,298,990 | 10/1942 | Utne | 40—32 |
| 2,346,765 | 4/1944 | Kratz | 74—241 X |
| 2,698,982 | 1/1955 | Smith et al. | 226—23 X |
| 2,819,544 | 1/1958 | Yosnioka | 40—32 |

EUGENE R. CAPOZIO, Primary Examiner

R. CARTER, Assistant Examiner

U.S. Cl. X.R.

198—202